United States Patent [19]

Wallstedt et al.

[11] Patent Number: 5,722,073
[45] Date of Patent: Feb. 24, 1998

[54] METHOD AND SYSTEM FOR MEASURING SIGNALS IN A TELECOMMUNICATIONS SYSTEM HAVING MAHO

[75] Inventors: Kenneth Yngve Wallstedt, Solna; Carl Magnus Frodigh, Kirsta; Per Johan Beming, Stockholm, all of Sweden

[73] Assignee: Telefonaktiebolaget L M Ericsson, Stockholm, Sweden

[21] Appl. No.: 604,599

[22] Filed: Feb. 21, 1996

[51] Int. Cl.$^6$ .............. H04Q 7/00; H04Q 9/00
[52] U.S. Cl. .............. 455/437; 455/438; 455/436; 455/560; 455/561
[58] Field of Search .............. 455/422, 436, 455/437, 438, 432, 442, 443, 550, 560, 561; 370/328, 331, 332

[56] References Cited

U.S. PATENT DOCUMENTS

| | | |
|---|---|---|
| 5,327,575 | 7/1994 | Menich et al. . |
| 5,379,447 | 1/1995 | Bonta et al. . |
| 5,423,064 | 6/1995 | Sakata . |
| 5,428,816 | 6/1995 | Barnett et al. . |
| 5,432,842 | 7/1995 | Kinoshita et al. . |
| 5,432,843 | 7/1995 | Bonta ........................ 455/438 |
| 5,475,868 | 12/1995 | Duque-Anton et al. ........ 455/62 |
| 5,483,669 | 1/1996 | Barnett et al. .............. 455/33.2 |
| 5,574,968 | 11/1996 | Olds et al. ................. 455/436 |

*Primary Examiner*—Reinhard J. Eisenzopf
*Assistant Examiner*—Marsha D. Banks-Harold
*Attorney, Agent, or Firm*—Jenkens & Gilchrist

[57] ABSTRACT

A method and system for measuring signal level in a telecommunications system having a mobile assisted handoff (MAHO) feature. The method and system utilizes the MAHO feature to perform signal level measurements, at a mobile station, on channels other than handoff measurement channels on which signal level is measured for MAHO purposes. Use of the method and system reduces the effects of making additional measurements on the efficiency of the MAHO process. A system operator may obtain signal level measurements for various purposes other than MAHO without adversely effecting the MAHO process.

23 Claims, 4 Drawing Sheets

METHOD AND SYSTEM FOR MEASURING SIGNALS IN A TELECOMMUNICATIONS SYSTEM HAVING MAHO

BACKGROUND OF THE INVENTION

1. Field of the Invention

This invention relates to mobile telecommunications systems, and more particularly, to a method and system for measuring RF signals in a cellular telecommunications system having a mobile assisted handoff feature.

2. Description of the Prior Art

In cellular mobile telecommunications systems it is often necessary to measure signal levels, on selected channels of the system, at a mobile station for different purposes. At certain times, resources for making measurements at the mobile station may be limited and it may be difficult to obtain an accurate set of measurements when it is desired to measure signal levels on a large number of channels at one time.

One task that uses resources required for making signal level measurements at a mobile station is the mobile assisted handoff (MAHO) task. MAHO is a process by which control of a call involving a mobile station is transferred from base station to base station as the mobile station moves throughout the system. Examples of systems in which MAHO has been implemented, include digital systems that operate according to the EIA/TIA IS-54B and IS-136 systems.

In IS-54B and IS-136 systems, the time division multiple access (TDMA) signal transmission mode is used. In TDMA, communications between a base station and a particular mobile station are transmitted on radio channels that also may be used for communications between the same base station and up to two different mobile stations. The communications are carried out through data or digitized voice signals that are transmitted as bursts in timeslots that are time multiplexed on the radio channels. Each mobile station in communication with a base station is assigned a timeslot on both the reverse channel and forward channels. The assigned timeslots are unique to each mobile station so communications between different mobiles do not interfere with each other.

A MAHO handoff process is specified to be used in the IS-54B and IS-136 standards. MAHO handoff measurement is done at the mobile station during the times when the mobile station is neither transmitting in the assigned reverse channel timeslot nor receiving in the assigned forward channel timeslot. In the MAHO process, during the times between signal bursts in an ongoing call, the mobile station periodically monitors radio channels (handoff measurement channels) of each base station located in close proximity to the base station with which the call is proceeding. The control channel of each neighboring base station is typically used as the handoff measurement channel. For each mobile station included in an ongoing call, the handoff measurement channels measured are contained in the neighbor cell list of the cell in which the call is proceeding. In addition to measuring the handoff measurement channels of neighboring base stations during an ongoing call, the mobile station also measures the received signal strength on the current channel on which the call is proceeding.

The mobile station measures the received signal strength on the handoff measurement channels and current channel and transmits the measurement results to the current base station. The current base station then forwards these measurement results to the MSC. If the received signal strength on the current channel falls below the received signal strength on a handoff measurement channel of a neighboring cell, the MSC initiates handoff to that neighboring cell.

The analog control channels (ACCH) of the neighboring cells are used as the handoff measurement channels for IS-54B MAHO. In IS-136 MAHO the digital control channels (DCCHs) of the neighboring cells are used as the handoff measurement channels for MAHO.

Because MAHO is performed mostly within the mobile station the resources for carrying out the process are limited. IS-54B or IS-136 mobile stations can perform only fifty measurements per second. Radio conditions such as Rayleigh fading, shadowing, etc. are such that it is necessary to average measurements in order to provide a reliable signal strength value. Therefore, it is necessary to limit the number of cells that comprise the neighbor cell list for MAHO measurement purposes to much less than fifty cells. The IS-54B standard limits the size of the neighbor cell list to twelve cells. IS-136 sets a size limit of twenty four. The increase in the size of the list in IS-136 over IS-54B has limited effect because the limit of fifty measurements per second still holds and any increase in the number of cells in the list dilutes signal strength measurement precision on any given handoff measurement channel.

At certain times it may be necessary to measure signal level at a mobile station on channels for purposes other than MAHO. Then number of channels on which it is derived to measure signal level may be quite large relative to the number of channels in the neighbor cell list. Because the MAHO process is resource intensive, as far as requiring use of resources available for making handoff measurements at a mobile station, it is difficult to obtain signal level measurements at the mobile station for other purposes without affecting the efficiency and accuracy of the MAHO process.

For example, measurements at the mobile station for purposes other than MAHO may be necessary in a system using adaptive channel allocation. In a system using adaptive channel allocation, a communications channel of the system may be assigned to any cell of the system. In this type of system, an adaptive channel allocation process is used in which interference measurements are done on available system communications channels within a particular cell. When it is necessary to allocate a communication channel for voice or traffic communications within the cell, one of the least interfered available channels is then allocated.

As for any signal level measurements, a greater accuracy in adaptive channel allocation is achieved by making a large as possible number of measurements including measurements during ongoing calls and measurements made at a mobile station. Since MAHO measurement resources are limited, in a system using both MAHO and adaptive channel allocation, it would be difficult to obtain the necessary signal level measurements at a mobile station with a desired accuracy. The same problem occurs when signal level measurements are to be made for purposes other than adaptive channel allocation.

It would provide an advantage then, in a cellular system having a MAHO function, to have a method and system for efficiently measuring RF signal levels at a mobile station while minimizing the effect of the measurements on the efficiency of the MAHO process.

SUMMARY OF THE INVENTION

The present invention provides a method and system for measuring RF signals in a cellular telecommunications system having a mobile assisted handoff (MAHO) feature.

The method and system utilizes the mobile assisted handoff measurement process to measure signal levels, at a mobile station, on additional channels other than handoff measurement channels on which signal level is measured for MAHO purposes. Use of the method and system allows signal level measurements to be made on the additional channels and on handoff measurement channels using a single neighbor cell list. Use of the method and system minimizes the effect of making measurements on the additional channels at the mobile station on the efficiency of the MAHO measurement process. The results of the measurements made on the additional channels can be utilized by the system operator as desired. For example, the additional channels may be channels that are adaptively allocated throughout the system and the measurement results on the additional channels may be used in the adaptive channel allocation process.

In an embodiment of the invention, additional channels to be measured are selectively added to a modified MAHO neighbor cell list that contains selected handoff measurement channels for a particular cell of the system. The additional channels and handoff measurement channels form a modified measurement list. The modified measurement list is then used in the MAHO measurement process to obtain signal level measurements on each channel in the list.

The additional channels are measured by transmitting measurement lists for measurement as a mobile station operates in a cell. Each measurement list is of a predetermined size, contains a predetermined number of handoff measurement channels and a predetermined number of additional channels. As a call is ongoing, different measurement cell lists are transmitted to the mobile station. For each neighbor cell list transmitted to the mobile station, at least one of the additional channels or, at least one of the handoff measurement channels, of the last previously transmitted neighbor cell list has been replaced with a different additional channel or different handoff measurement channel. The additional channels and handoff measurement channels may be replaced one at a time or, as a group of more than one, so that the neighbor cell list remains of a predetermined size. The process of transmitting modified measurement cell lists and making measurements continues until the call is terminated. The additional channels may be added to the measurement list in a different order for different mobile stations operating in the cell.

The process may be repeated during each call, until a desired set of measurements has been obtained on the set of additional channels.

Signal level measurements may be made on N available handoff measurement channels contained in an initial measurement list that is transmitted to the mobile station at call setup. The Y handoff measurement channels having the Y highest signal levels of measurements made on the N available handoff measurement channels may then be selected as the handoff channels to be included in the measurement list. The number of additional channels to be included in the list along with the handoff measurement channels may then be chosen so that the measurements list remains of a size of N channels. Alternatively, the handoff measurement channels may be selected by choosing all handoff measurement channels having a signal level above a predetermined threshold and a number of additional measurement channels can be added to create a list of a desired size. The size of the neighbor cell list may be determined by system standards and efficiency considerations. As the call is ongoing, the handoff measurement channels in the measurement list can be replaced by other handoff measurement channels and, measurements made to verify that the handoff measurement channels in the measurement list conform to the criteria by which they were selected.

DETAILED DESCRIPTION

Figure 1:
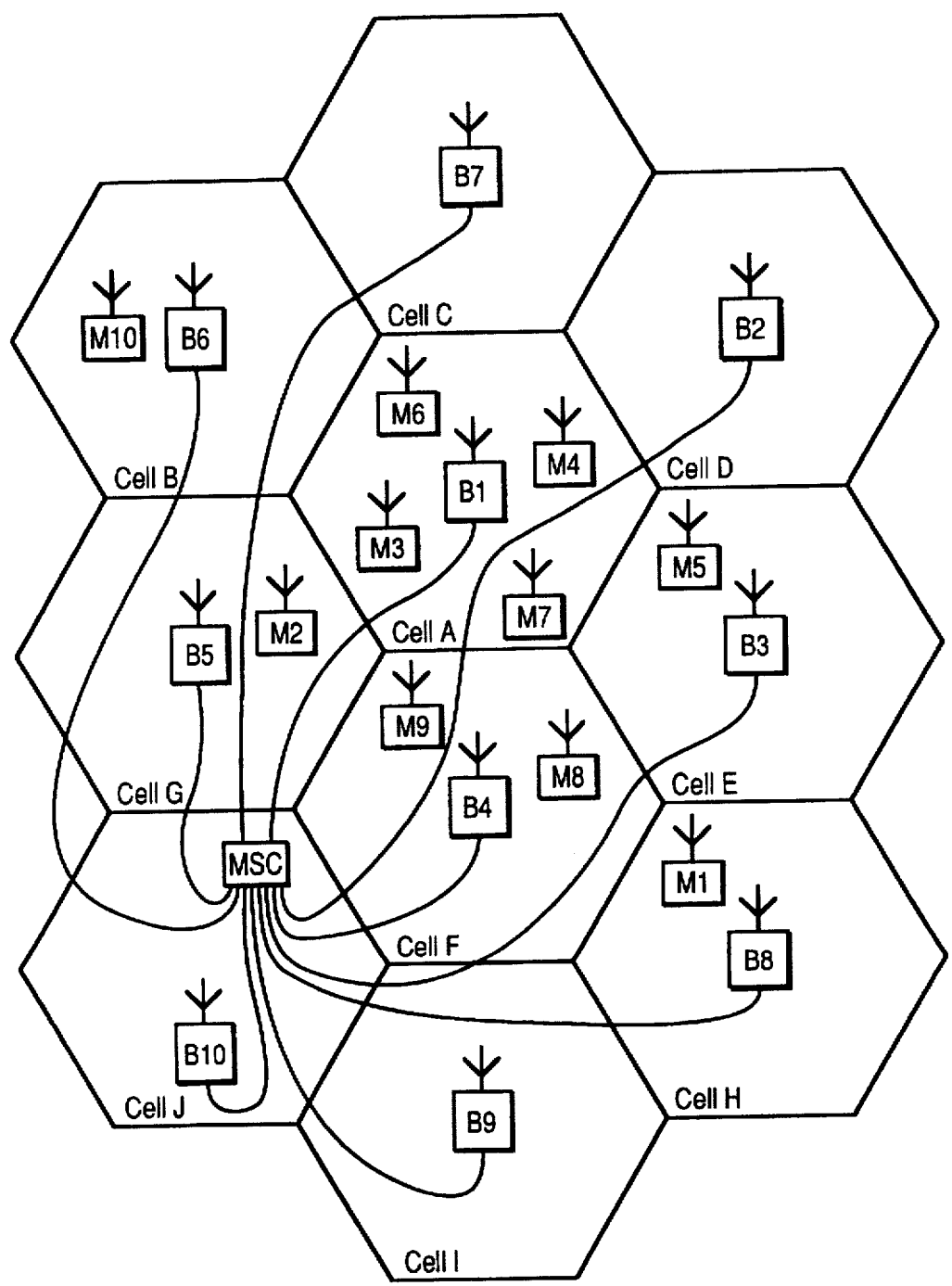
FIG. 1 illustrates ten cells within a cellular telecommunications system of the type to which the present invention generally pertains.

Referring to FIG. 1, there is shown a portion of a conventional cellular radio communication system of the type to which the present invention generally pertains. In FIG. 1, an arbitrary geographic area may be divided into a plurality of contiguous radio coverage areas, or cells Cell A-Cell J. While the system of FIG. 1 is illustratively shown to include only ten cells, it should be clearly understood that in practice, the number of cells will be much larger.

Associated with and located within each of Cell A-Cell J is a base station designated as a corresponding one of a plurality of base stations B1-B10. Each of the base stations B1-B10 includes a transmitter, a receiver, and a base station controller as are well known in the art. In FIG. 1, the base stations B1-B10 are illustratively located at the center of each of Cell A-Cell J, respectively, and are equipped with omni-directional antennas. However, in other configurations of the cellular radio system, the base stations B1-B10 may be located near the periphery, or otherwise away from the center of the Cell A-Cell J and may illuminate Cell A-Cell J with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1-M10 may be found within Cell A-Cell J. Each of the mobile stations M1-M10 includes a transmitter, a receiver, and a mobile station controller as are well known in the art. Again, only ten mobile stations are shown in FIG. 1 but it should be understood that the actual number of mobile stations will be much larger in practice and will invariably greatly exceed the number of base stations. Moreover, while none of the mobile stations M1-M10 may be found in some of Cell A-Cell J, the presence or absence of the mobile stations M1-M10 in any particular one of Cell A-Cell J should be understood to depend in practice on the individual desires of users of the mobile stations M1-M10, who may roam from one location in the cell to another or from one cell to an adjacent cell or neighboring cell, and even from one cellular radio system served by an MSC to another such system.

Telephone calls may be initiated or received at each of the mobile stations M1-M10 through one or more of the base stations B1-B10 and a mobile station switching center (MSC). A mobile station switching center (MSC) is connected by communication links, e.g., cables, to each of the illustrative base stations B1-B10 and to the fixed public switched telephone network (PSTN), not shown, or a similar fixed network which may include an integrated system digital network (ISDN) facility. The relevant connections between the mobile station switching center (MSC) and the base stations B1-B10, or between the mobile station switching center (MSC) and the PSTN or ISDN, are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

Each MSC may control in a system the administration of communication between each of the base stations B1-B10 and the mobile stations M1-M10 in communication with it. As a mobile station roams about the system, the mobile station registers its location with the system through the base stations that control the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1-B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A-Cell J is allocated a plurality of voice or speech channels and at least one control channel, such as an analog control channel (ACCH) or digital control channel (DCCH). The control channel is used to control or supervise the operation of mobile stations by means of information transmitted to and received from those units. Such information may include call originations, page signals, page response signals, location registration signals and voice channel assignments.

The method and system of the invention may be implemented into a system similar to that shown in FIG. 1 that utilizes a mobile assisted handoff function. The handoff may be done by the method of mobile assisted handoff (MAHO) specified in commonly assigned U.S. Pat. No. 5,200,957 to Dahlin, which is hereby incorporated by reference. During the procedure for call setup on digital communication channel, the base station informs the mobile station of radio channel frequency and also of a timeslot that identifies the timeslot to be used and digital voice color code (DVCC). During the call setup procedure, the base station also informs the mobile station of a plurality of DCCH channels the signal strength of which are to be measured by the mobile for handoff purposes. This plurality of DCCH channels are the DCCH channels of cells which comprise the neighbor cell list.

Figure 2:
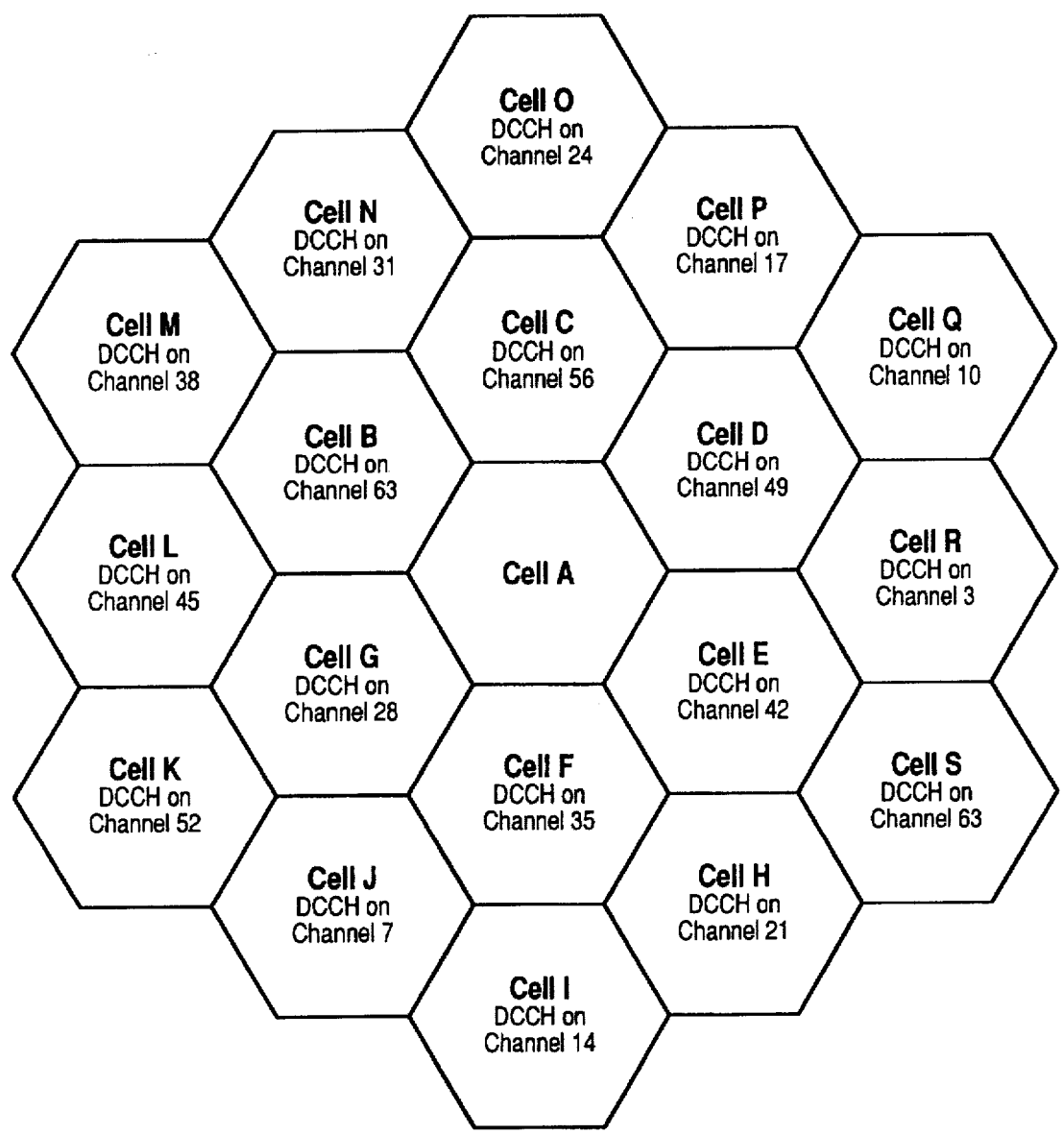
FIG. 2 shows the cells of the system shown in FIG. 1 with additional cells.

Referring now to FIG. 2, therein are shown the cells of the system shown in FIG. 1 with additional cells. Each of the cells shown in FIG. 2 has a DCCH associated with it. As a mobile station involved in an ongoing call moves among Cell A-Cell S of FIG. 2, measurements are made on DCCH channels of neighbor cells that are contained in the neighbor cell list. The system will handoff control of call communications from cell to cell based on these measurement results. Depending upon the movement of the mobile station, as well as other circumstances, each time a handoff occurs a new plurality of DCCH channels will be selected and the corresponding neighbor cell list transmitted to the mobile station from the responsible base station during the course of the connection. During the course of the connection the mobile station measures the signal strength of signals on the given plurality of DCCH channels. Measurements are done during time slots not used by the digital communication channel.

The mobile station also measures signal strength on the digital communication channel used for the established connection and the bit error rate on the established connection. The mobile station transmits results of its measurements, preferably averaged, frequently to the base station, preferably twice a second.

The base station also measures signal strength on the digital communication channel used for the established connection and the bit error rate on the established connection. The base station processes and analyzes the results of its own measurements and the measurements of the mobile station for comparison with handoff criteria. When, according to the results and criteria, a handoff is desired, the base station informs the mobile switching center indicating at least one target base station assumed suitable for taking over the responsibility for the communication with the mobile.

The mobile switching center requests the target base station(s) to measure signal strength on a radio channel in the timeslot used by the mobile for the established connection. The mobile switching center also informs the target base station on the digital color code used by the mobile station.

The target base station(s) tune(s) a receiver to the radio channel indicated by the mobile switching center and uses the timeslot identifier of the indicated timeslot for burst synchronization. The target base station checks the appearance of the digital verification color code indicated by the mobile switching center and measures the signal strength of the burst signal provided the digital verification color code is correct. The target base station then transmits the results of the signal strength measurement to the mobile switching center. The target base station also informs the mobile switching center on the result of the checking of the appearance of the digital verification color code, i.e., whether the digital verification color code appeared in the burst in the timeslot of the radio channel.

The mobile switching center determines whether handoff to a target base station should be performed taking the results of the signal strength measurements of target base(s) into account as well as other circumstances, e.g., traffic load.

The target base stations may be ranked according to measured signal level on the measurement channel of each base station or, alternatively, according to measured signal level on the measurement channel of each base station and a ranking penalty which is determined by cell characteristics such as transmitter power or cell size. The cells of all target base stations may be assigned a ranking value. For example, a ranking value for cell i could be calculated as follows:

$R_i = SS_i(dB) - P_i$ where $SS_i$ is measured signal level and $P_i$ is the ranking penalty of Cell i. For example, $P_i$ could be set higher for cells carrying a heavy load of call traffic.

In order to avoid a large number of handoffs for fast moving mobile stations in a system having macro and micro cells, it is desirable to hand a fast moving mobile station off to larger macro cells. Let T be the time value of a timer started when a threshold signal level is detected on the measurement channel of a candidate cell. In this case the ranking value of Cell i could be calculated as follows:

$$R_i = SS_i(dB) - P_i - P_{tempi} \bullet H(T - T_{tempi})$$

where $P_{tempi}$ is an extra ranking penalty applied during the limited time period duration $T_{tempi}$. The function H is such that:

$$H(x) = \begin{cases} 1, X < 0 \\ 0, X \geq 0 \end{cases}$$

If the mobile station moves fast in relation to the size of a microcell it will pass the microcell without making a handoff to the microcell, even though the microcell has a high signal level strength as measured at the mobile station. If the mobile station moves slow, $H(T-T_{tempi})$ may become 0 and, the microcell may rise in the handoff candidate rankings.

The method and system of the embodiment is implemented into an IS-136 system such as the system shown in FIGS. 1 and 2.

Figure 3:
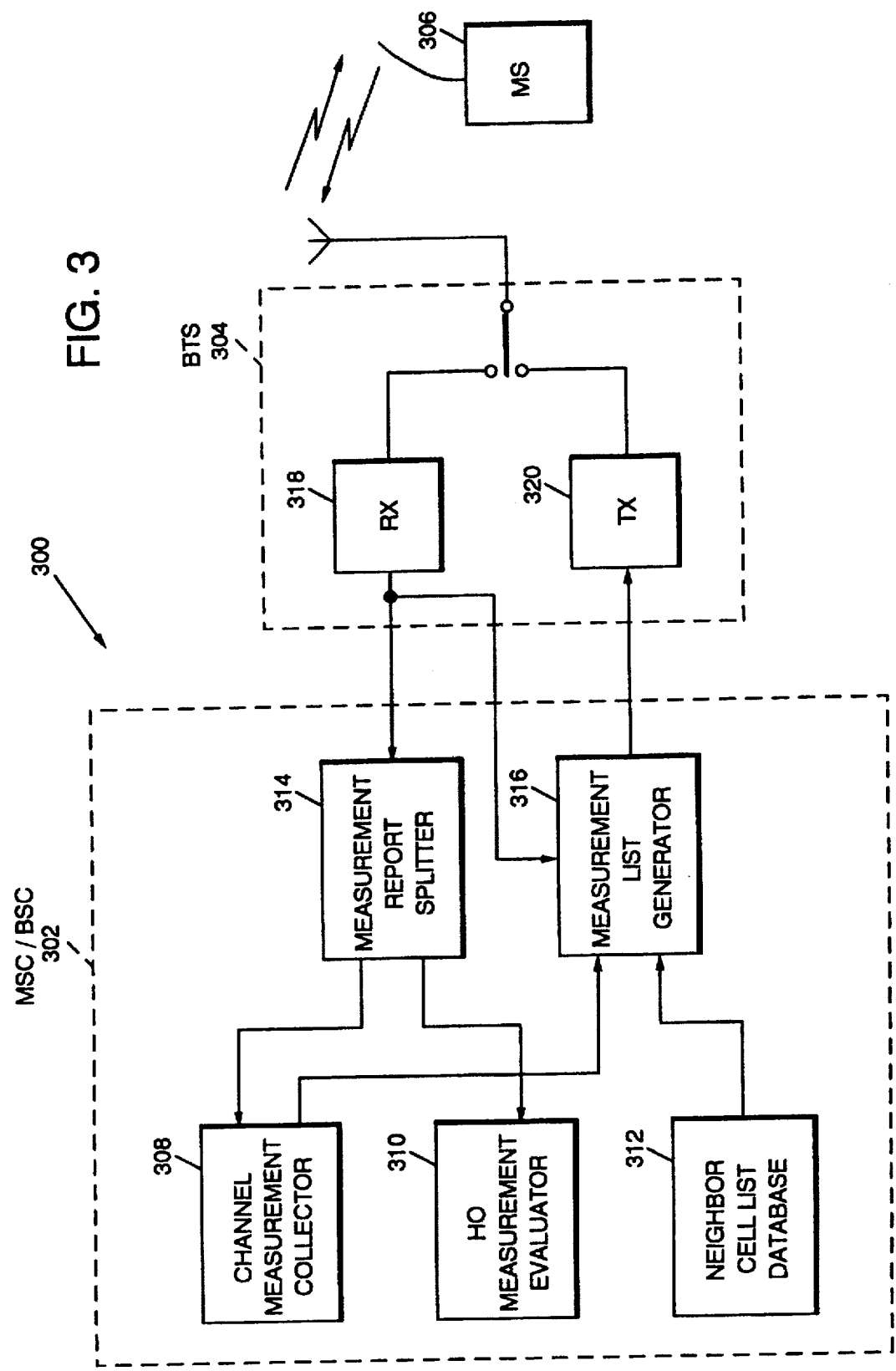
FIG. 3 is a block level diagram of portions of a cellular system according to an embodiment of the invention.

Referring now to FIG. 3, therein is shown a block level diagram of portions of a cellular system according to an embodiment of the invention. The cellular system includes mobile switching center/base station controller (MSC/BSC) 302, base transceiver station (BTS) 304 and mobile station (MS) 306. The BTS 304 comprises receiver equipment (RX) 318, and transmitter equipment (TX) 320. MSC/BSC 302 comprises a channel measurement collector 308, handoff (HO) measurement evaluator 310, neighbor cell list database 312, measurement report splitter 314 and measurement list generator 316. The functions of the functional blocks illustrated in FIG. 3 may be implemented in hardware and/or software. The functional blocks located within MSC/BSC 302 may be implemented in either the MSC or BSC separately or may be allocated between the MSC and BSC. One skilled in the art will realize that various combinations of hardware and software may be used to implement these functions.

The functional blocks of FIG. 3 may be used to perform process steps for performing signal measurements according to an embodiment of the invention.

Figure 4:
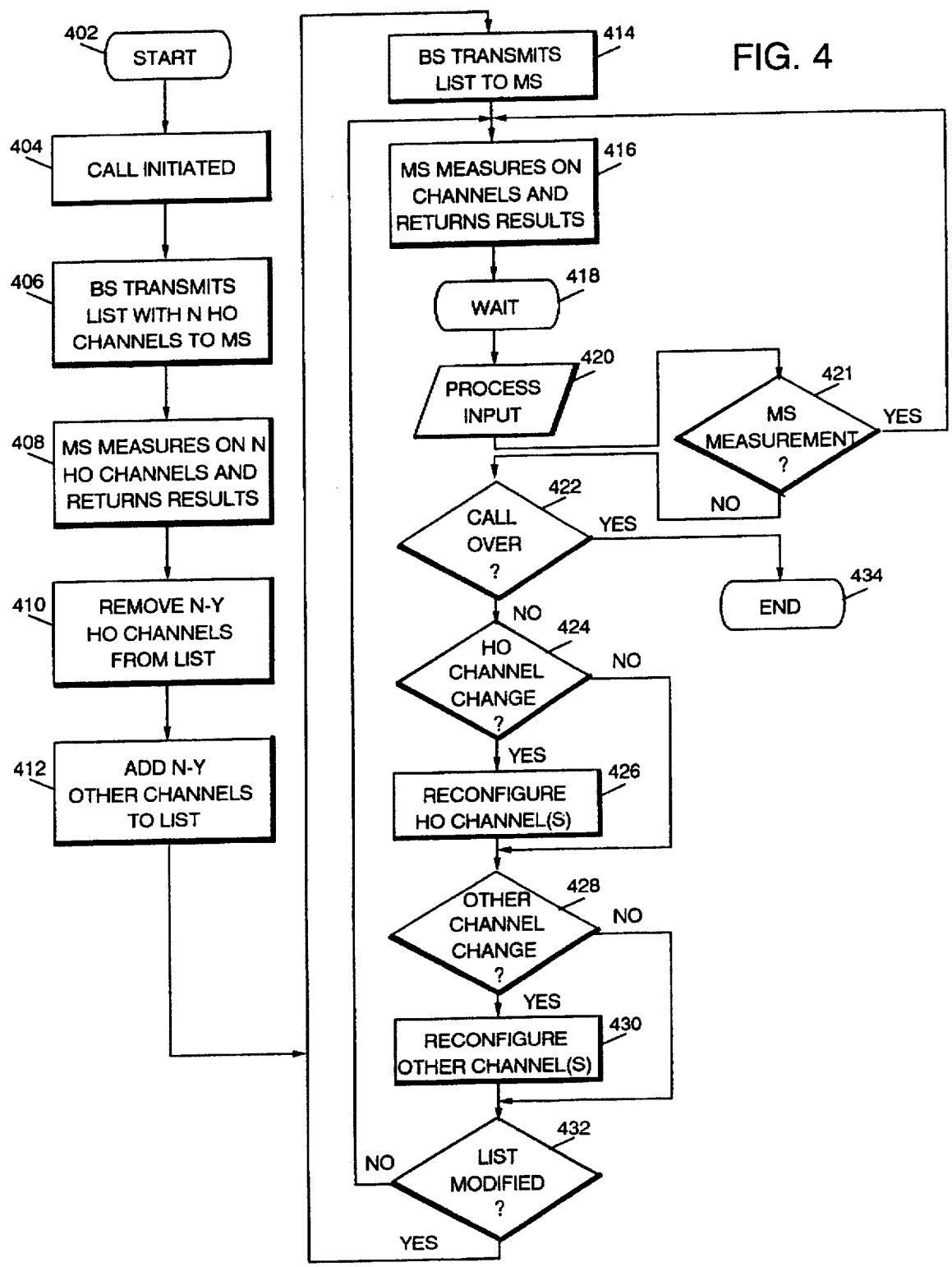
FIG. 4 is a flow diagram illustrating steps performed within a cellular telecommunications system according to an embodiment of the invention.

Referring now to FIG. 4, therein is a flow diagram illustrating steps performed within a cellular telecommunications system according to an embodiment of the invention. The individual steps are performed for each call involving each mobile station operating within the system. FIG. 4 may be described with reference to the functional blocks of FIG. 3.

The process begins at Step 402 when the user of a mobile station initiates a call or a call is received in the base station for a mobile station operating within the coverage area of the base station.

Next, at Step 404, measurement list generator 316 forms an initial neighbor list using the neighbor cell list database 312. The initial neighbor cell list contains N handoff measurement channels. These N handoff measurement channels are the DCCHs of the N best candidate handoff neighbor cells. The measurement list generator 316 transfers the initial measurement list to TX 320. Then, Step 406, BTS 304 transmits the initial measurement channel list containing N handoff measurement channels to mobile station 306.

Next, at Step 408, mobile station 306 performs measurements on the N handoff measurement channels in the initial measurement list and returns the results to BTS 304. Receiver 318 receives the measurement results and transfers the results to measurement list generator 316. The process then moves to Step 410 where measurement list generator 316 determines the Y handoff measurement channels having the strongest received signal strengths of the N handoff measurement channels in the initial neighbor measurements list. Measurement list generator 316 then removes the N-Y handoff measurement channels having the weakest received signal strengths from the measurement list.

As an alternative to retaining only the Y handoff measurement channels having the strongest received signal strengths, all handoff measurement channels having a signal strength below a predetermined level, or, below a predetermined level in reference to the signal strength of the channel carrying the call could be removed from the list, with the handoff measurement channels remaining in the list forming the Y handoff measurement channels.

As another alternative to Step 410, the Y handoff measurement channels having the highest ranking value, as a function of both a ranking penalty and a measured signal level, are kept in the measurement list of N handoff measurement channels. The ranking may be determined as previously described. If the ranking function involves use of a temporary ranking penalty, the temporary ranking should be removed before the Y measurement channels are selected.

Next, at Step 412, measurement list generator 316 determines N-Y other measurement channels by accessing channel measurement collector 308, and then adds these N-Y other measurement channels to the neighbor list to form a modified measurement list. The modified measurement list is then transferred by measurement list generator 316 to transmitter 320. The process then moves to Step 414. At Step 414 BTS 304 transmits the modified measurement list to mobile station 306.

Next, at Step 416, mobile station 306 measures signal strength levels on all channels in the measurement list and returns the results to BTS 304. The measurement results are then transferred to the measurement report splitter 314 and measurement list generator 316. Measurement report splitter 314 then transfers the results of the handoff measurement channel measurements to measurement evaluator 310 and the results of the other measurement channel measurements to the channel measurement collector 308. The process then moves to Step 418 where the measurement list generator 316 waits for a process input.

Next, at Step 420, a process input is received. The process input could be either an signal indicating that the call is over, an internal signal generated within the measurement list generator 316 indicating that the modified measurement list should be reconfigured in order to perform signal measurements or, an internal signal generated within mobile station 306 indicating that mobile station 306 should perform signal measurements and transmit the results to BTS 304.

After receiving a process input, the process moves to Step 421. At Step 421 a determination within mobile station 306 is made as to whether the signal indicates that mobile station 306 should perform signal measurements and transmit the results to BTS 304. If it is determined that mobile station 306 should perform signal measurements the process moves back to Step 416 where mobile station 306 measures signal strength levels on all channels in the measurement list and returns the results to BTS 304. If, however at Step 421, it is determined that the process input is not an internally generated signal indicating that mobile station 306 should performed measurements, the process moves to Step 422. At Step 422 a determination is made as to whether or not the call is over. If it is determined that the call is over, the process moves to Step 434 and ends. If, however, at Step 422, it is determined that the call is not over, the measurement list is to be modified to make new signal level measurements and, the process moves to Step 424. The list may be reconfigured for new measurements by either replacing handoff measurement channels in the list with other handoff measurement channels or, by replacing the other measurement channels in the list with other measurement channels. Handoff measurement channel changes and other measurement channel changes may be done simultaneously for the same list simultaneously or, for the handoff measurement channels or other measurement channels each separately while leaving the other channels unchanged. At Step 424 measurement list generator 316 makes a determination as to whether or not the measurement list reconfiguration involves a handoff measurement channel change. If it is determined that the measurement list reconfiguration involves a handoff measurement channel change, the process moves to Step 426. At Step 426 measurement list generator 316 reconfigures the handoff measurement channels in the list. The handoff measurement channels may be reconfigured by replacing handoff measurement channels singly or in numbers greater than one, with handoff measurement channels that were removed from the list at Step 410. The system operator may adjust the process as desired so that as calls proceed within the cell, signal level measurements are made on all of the N original channels that compiles the initial measurement list. The operator can then be assured that the significant changes in any of the signal strengths of the N original channels are not missed. From Step 426, the process then moves to Step 428. If however, at Step 424, it is determined that a handoff measurement channel change is not be made, the process moves to Step 428 without a handoff measurement channel change.

At Step 428 measurement list generator 316 determines whether the other measurement channels in the list are to be reconfigured. If it is determined that the other measurement channels in the list are to be reconfigured, the process moves to Step 430. At Step 430 the reconfiguration of the other measurement channels in the list is performed by replacing selected other measurement channels in the list with measurement channels from channel measurement database 308. If the number of other measurement channels to be measured is large, Step 430 may be performed more frequently than Step 426 as the process of FIG. 4 is performed. The replacement of the other measurement channels may be done singly or, in numbers greater than one, so that signal level measurements can be obtained for a desired set of other measurement channels of the system. From Step 430, the process then moves to Step 432. If, however, at Step 428, it is determined that the other measurement channels in the list are not to be reconfigured, the process will move directly to Step 432.

At Step 432 measurement list generator 316 determines whether the measurement list has been modified at either Step 424 or Step 428. If it is determined that the measurement list has been modified, the process moves to Step 414. At Step 414 measurement list generator 316 transfers the modified measurement list to transmitter 320 and BTS 304 transmits the list to mobile station 306. The process steps of Step 416 through Step 432 are then repeated until the call ends. If, however, at Step 432 it is determined that the list is not modified, the process will move to Step 416. Step 416 through Step 432 are again then repeated. The process will continue until the call ends and then moves to Step 434. As the call continues, the process will repeat Steps 418 through 432 and then either Step 414 or Step 416. By changing the handoff measurement channels in the list at Step 426 and the other measurement channels in the list at Step 428, a desired set of signal level measurements on handoff measurement channels and other measurement channels may be obtained. The system operator may set the timing of Steps 426 and 428 so that a desired accuracy is achieved for both the handoff signal level measurements and the other signal level measurements.

While the embodiment of the invention has been described as implemented into the IS-136 system, it will be obvious to one skilled in the art that the invention has equal applicability to the IS-54B, GSM, PDC, or similar systems.

The invention also is applicable to CDMA type systems, such as systems operating according to the IS-95 system standard, in which MAHO measurements are made on neighboring base stations using predefined pilot code sequences. Such systems may also have a neighbor cell list limited in size.

As can be seen from the above description, the measurement process and system of the invention allows a system operator to obtain signal level measurements on channels other than those handoff measurement channels on which signal level is measured for MAHO purposes utilizing the MAHO process. The results of the measurements on the additional channels may then be used as desired by the system operator. For example, the system operator may use the measurement results to create a new accurate neighbor cell list or, may use the measurement results in an adaptive channel allocation process.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a telecommunications system having a plurality of base stations and a plurality of mobile stations operating within the coverage areas of said plurality of base stations, wherein a selected mobile station of said plurality of mobile stations is capable of measuring signal levels on channels identified in a measurement list transmitted to said selected mobile station from a first base station and, said system is capable of handing off communications with said selected mobile station from said first base station to a second base station by utilizing measurements made on a plurality of handoff measurement channels, a method for measuring signal levels on channels of said system at said selected mobile station, said method comprising the steps of:

(a) placing a selected plurality of channel identifiers comprising N handoff measurement channel identifiers in the measurement list;

(b) transmitting the measurement list to the selected mobile station;

(c) measuring at the selected mobile station, a signal level on each of the channels identified in the measurement list, thereby obtaining a first set of measurement results;

(d) transmitting said first set of measurement results to the first base station;

(e) assigning, responsive to said first set of signal level measurements, a ranking value indicating an order of preference for handoff to each of said N handoff measurement channels, wherein a selected ranking value of a selected measurement channel is a function of a signal strength level and a ranking penalty of said selected measurement channel, wherein, each of said N handoff measurement channels is assigned a ranking penalty; and removing, responsive to said first set of measurement results, N-Y handoff measurement channel identifiers from the measurement list, thereby leaving Y handoff channel identifiers in the measurement list;

(f) adding X channel identifiers identifying X channels of a plurality of other channels to the measurement list;

(g) transmitting the measurement list to the selected mobile station;

(h) measuring, at the selected mobile station, a signal level on each of the channels identified in the measurement list thereby obtaining a second set of measurement results on said Y handoff measurement channels and a third set of measurement results on said X other channels; and (i) transmitting said second and third set of measurement results to the first base station.

2. The method of claim 1, wherein X=N-Y.

3. The method of claim 1, wherein X<N-Y.

4. The method of claim 1, wherein X>N-Y.

5. The method of claim 1 further comprising the step of repeating steps (e) through (i), wherein the variable Y varies between repetitions of step (e).

6. The method of claim 1 wherein step (e) comprises removing N-Y handoff measurement channel identifiers of handoff measurement channels having the N-Y lowest signal strengths measured during step (c).

7. The method of claim 1 wherein said step (e) comprises removing N-Y handoff measurement channel identifiers of handoff measurement channels having a signal strength level less than a predetermined signal strength level.

8. The method of claim 1 wherein the communications between the selected mobile station and the first base station are carried out over a selected channel and said step (e) comprises removing N-Y handoff measurement channel identifiers having a signal strength level less than a predetermined signal strength level, wherein said predetermined signal strength level is defined relative to a signal level on said selected channel.

9. The method of claim 1, wherein step (e) further comprises the step of:

(e1) assigning, responsive to said first set of signal level measurements, a ranking value indicating an order of preference for handoff to each of said N handoff measurement channels, wherein a selected ranking value of a selected handoff measurement channel is a function of a signal strength level and a ranking penalty of said selected measurement channel; and (e1) removing N-Y measurement channel identifiers of handoff measurement channels, having the N-Y lowest ranking value assigned in Step (e), from the measurement list.

10. The method of claim 1, further comprising the steps of:

(j) substituting at least one of said N-Y handoff measurement channel identifiers removed from the list during step (e) for at least one of said Y handoff measurement channel identifiers in the measurement list; and (k) repeating steps (g),(h), (i) and (j) for a predetermined number of iterations.

11. The method of claim 10 in which said N handoff measurement channel identifiers placed in the measurement list in the first iteration of step (a) comprise original channel measurement identifiers, and, in which said method further comprises the steps of:

(l) repeating steps (a) through (k) wherein said N handoff measurement channel identifiers in subsequent iterations of step (a) comprise said original measurement channel identifiers.

12. The method of claim 1 wherein further comprising the steps of:

(j) substituting at least one other channel identifier of said second plurality of channels for at least one of said N-Y channel identifiers added to the measurement list during step (f); and (k) repeating steps (g),(h), (i) and (j) for a predetermined number of iterations.

13. The method of claim 12 in which said N handoff measurement channel identifiers placed in the measurement list in the first iteration of step (a) comprise original channel measurement identifiers, and, in which said method further comprises the steps of:

(l) repeating steps (a) through (k) wherein said N handoff measurement channel identifiers in subsequent iterations of step (a) comprise said original measurement channel identifiers.

14. In a telecommunications system having a plurality of base stations and a plurality of mobile stations operating within the coverage areas of said plurality of base stations, wherein a selected mobile station of said plurality of mobile stations is capable of measuring signal levels on channels identified in a measurement list of channels transmitted to said selected mobile station from a first base station and, said system is capable of handing off communications with said selected mobile station from said first base station to a second base station by utilizing measurements made on a plurality of handoff measurement channels, an apparatus for measuring signal levels on channels of said system at a selected mobile station, said apparatus comprising:

a measurement report splitter for receiving at least one measurement report comprising results of signal level measurements performed at the selected mobile station on at least one handoff measurement channel identified in a first measurement list wherein said measurement report splitter generates a first signal comprising results of said first measurement report;

a first memory device for storing a neighbor cell list database;

a measurement list generator, coupled to said first memory device, said measurement list generator for receiving said first signal, accessing said neighbor cell list data base and, generating a second measurement list comprising Y handoff measurement channel identifiers and X other measurement channel identifiers.

15. The apparatus of claim 14, wherein X=N-Y.

16. The apparatus of claim 14, wherein X<N-Y.

17. The apparatus of claim 14, wherein X>N-Y.

18. The apparatus of claim 14, further comprising:

a transmitter, coupled to said measurement list generator, said transmitter for transmitting said second measurement list to a selected mobile station; and a receiver, coupled to said measurement report splitter, said receiver for receiving results of signal level measurements from said selected mobile station and transferring said results to said measurement report splitter.

19. The apparatus of claim 14, wherein, further, said measurement report splitter receives a second measurement report comprising results of signal level measurements made on said second measurement list generated in said measurement list generator and generates, responsive to receiving said second measurement list, a second and third signal, wherein said second signal comprises results of signal level measurements made on said Y handoff measurement channels and said third signal comprises results of signal level measurement made on said X other measurement channels.

20. The apparatus of claim 19 wherein said apparatus further comprises:
- a channel measurement collector, coupled to said measurement report splitter, said channel measurement collector for receiving said third signal; and
- a handoff measurement evaluator, coupled to said measurement report splitter, said handoff measurement evaluator for receiving said second signal and evaluating said Y handoff measurement channels for handoff.

21. The apparatus of claim 19 wherein said Y handoff measurement channels comprise handoff measurement channels having the highest signal level measurements in said first measurement report.

22. The apparatus of claim 19 wherein said Y handoff measurement channels comprise handoff measurement channels having signal level measurements of said first measurement report above a predetermined level.

23. The apparatus of claim 22 wherein communications between the selected mobile station and the first base station are carried out over a selected channel and wherein said predetermined level is defined relative to a signal level on said selected channel.

* * * * *